United States Patent
Lee et al.

(10) Patent No.: US 8,787,307 B2
(45) Date of Patent: Jul. 22, 2014

(54) MOBILE TERMINAL AND METHOD OF MOVING NETWORK THEREOF

(75) Inventors: Jong Hoon Lee, Gyeonggi-do (KR); Sangwon Lee, Seoul (KR); Joo Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 834 days.

(21) Appl. No.: 12/637,691

(22) Filed: Dec. 14, 2009

(65) Prior Publication Data

US 2010/0150112 A1 Jun. 17, 2010

Related U.S. Application Data

(60) Provisional application No. 61/122,714, filed on Dec. 15, 2008.

(51) Int. Cl.
*H04W 4/00* (2009.01)
*H04W 36/00* (2009.01)

(52) U.S. Cl.
USPC ........... 370/331; 370/332; 370/338; 455/436; 455/440

(58) Field of Classification Search
None
See application file for complete search history.

(56) References Cited

U.S. PATENT DOCUMENTS

| | | | |
|---|---|---|---|
| 2005/0227691 A1* | 10/2005 | Pecen et al. | 455/435.2 |
| 2008/0008127 A1* | 1/2008 | Choi et al. | 370/331 |
| 2008/0057912 A1* | 3/2008 | Deprun | 455/413 |
| 2011/0164588 A1* | 7/2011 | Kwon et al. | 370/331 |
| 2012/0225654 A1* | 9/2012 | Junela et al. | 455/435.2 |

* cited by examiner

*Primary Examiner* — Chirag Shah
*Assistant Examiner* — Srinivasa Reddivalam
(74) *Attorney, Agent, or Firm* — Lee, Hong, Degerman, Kang & Waimey

(57) ABSTRACT

A mobile terminal and method of moving network thereof are disclosed. The mobile terminal includes a first communication module configured to set a link with a first network, to receive second network-associated information from the first network, and to output the received second network-associated information, a second communication module configured to set a receive-only mode with respect to the second network, to receive signal strength information of one or more neighbor cells belonging to the second network from the second network using the second network-associated information output from the first communication module, and to output the received signal strength information and a controller configured to control a signal input/output operation between the first and second communication modules and a signal transmission/reception operation between the first communication module and the first network, and the second communication module and the second network, respectively.

11 Claims, 9 Drawing Sheets

FIG. 2C
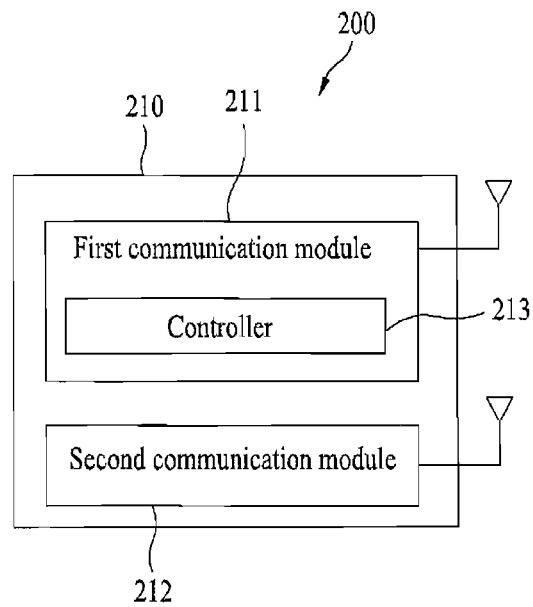
(a)
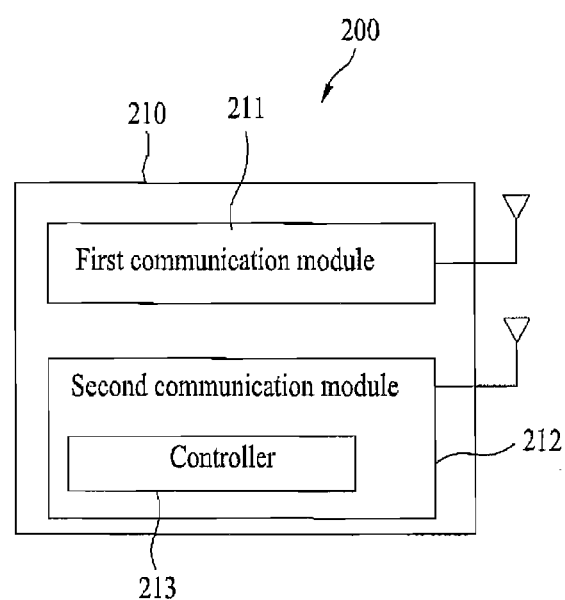
(b)

FIG. 5

```
-- ASN1START
SystemInformationBlockType8 ::=SEQUENCE {
    systemTimeInfo       SystemTimeInfoCDMA2000       OPTIONAL,
    -- Need OR
    searchWindowSize     INTEGER (0..15)              OPTIONAL,
    -- Need OR
    parametersHRPD       SEQUENCE {
        preRegistrationInfoHRPD       PreRegistrationInfoHRPD,
        cellReselectionParametersHRPD   CellReselectionParametersCDMA2000   OPTIONAL
        -- Need OR
        ⋮

CellReselectionParametersCDMA2000 ::= SEQUENCE {
    bandClassList             BandClassListCDMA2000,
    neighCellList             NeighCellListCDMA2000, t-ReselectionCDMA2000     T-Reselection,
    t-ReselectionCDMA2000-SF  SpeedStateScaleFactors   OPTIONAL
    -- Need OP
}
501 —— NeighCellListCDMA2000 ::=      SEQUENCE (SIZE (1..16)) OF NeighCellCDMA2000 bandClass                 BandclassCDMA2000,
502 —— neighCellsPerFreqList  NeighCellsPerBandclassListCDMA2000  —— 503
}

NeighCellsPerBandclassListCDMA2000 ::= SEQUENCE (SIZE (1..16)) OF
NeighCellsPerBandclassCDMA2000

NeighCellsPerBandclassCDMA2000 ::=SEQUENCE {
    arfcn                     ARFCN-ValueCDMA2000,
    physCellIdList            PhysCellIdListCDMA2000
    }
                              ⋮
```

FIG. 6

```
-- ASN1START

MeasObjectCDMA2000 ::=            SEQUENCE {
            cdma2000-Type                 CDMA2000-Type,
601 ——   carrierFreq                      CarrierFreqCDMA2000,
602 ——   searchWindowSize   INTEGER (0..15)                      OPTIONAL,
            -- Need ON
            offsetFreq                    Q-OffsetRangeInterRAT  DEFAULT 0,
603 ——   cellsToRemoveList    CellIndexList                      OPTIONAL,
            -- Need ON
604 ——   cellsToAddModList    CellsToAddModListCDMA2000          OPTIONAL,
            -- Need ON
            cellForWhichToReportCGI   PhysCellIdCDMA2000          OPTIONAL,
            -- Need ON
            ...
        }

CellsToAddModListCDMA2000 ::=    SEQUENCE (SIZE (1..maxCellMeas)) OF
        CellsToAddModCDMA2000

CellsToAddModCDMA2000 ::=SEQUENCE {
            cellIndex                    INTEGER (1..maxCellMeas),
605 ——   physCellId                      PhysCellIdCDMA2000
        }
```

FIG. 7

```
-- ASN1START
    MeasResults ::=                SEQUENCE {
    measId                         MeasId,
    measResultServCell             SEQUENCE {
        rsrpResult                     RSRP-Range,
        rsrqResult                     RSRQ-Range
    },
    measResultNeighCells           CHOICE {
        measResultListEUTRA            MeasResultListEUTRA,
        measResultListUTRA             MeasResultListUTRA,
        measResultListGERAN            MeasResultListGERAN,
        measResultsCDMA2000            MeasResultsCDMA2000,
        ...
    }                                                          OPTIONAL,
    ...
}
                                   :
    MeasResultsCDMA2000 ::=        SEQUENCE {
        preRegistrationStatusHRPD      BOOLEAN,
        measResultListCDMA2000         MeasResultListCDMA2000
    }
    MeasResultListCDMA2000 ::=     SEQUENCE (SIZE (1..maxCellReport)) OF
    MeasResultCDMA2000
    MeasResultCDMA2000 ::=SEQUENCE {
701 ── physCellId                  PhysCellIdCDMA2000,
        cgi-Info                       CellGlobalIdCDMA2000    OPTIONAL,
        measResult                     SEQUENCE {
            pilotPnPhase                   INTEGER(0..32767)   OPTIONAL,
702 ── pilotStrength                INTEGER (0..63),
            ...
        }
    }
                                   :
```

MOBILE TERMINAL AND METHOD OF MOVING NETWORK THEREOF

This application claims the benefit of Provisional Application No. 61/122,714, filed on Dec. 15, 2008, which is hereby incorporated by reference as if fully set forth herein.

BACKGROUND OF THE INVENTION

1. Field of the Invention

The present invention relates to a mobile terminal for supporting movement between heterogeneous networks and a method of moving a network thereof.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

In general, a mobile terminal for supporting movement between networks may transmit or receive data to or from a first network when located at the first network and may transmit or receive data to or from a second network when moved to the second network. Accordingly, the mobile terminal may not receive any data from the second network when located at the first network.

As described above, when the mobile terminal moves from the first network to the second network, considerable time is consumed to register the mobile terminal in the second network so as to set a link. Accordingly, when the network is moved, data communication may be stopped or delayed.

SUMMARY OF THE INVENTION

Accordingly, the present invention is directed to a mobile terminal and a method of moving a network thereof that substantially obviate one or more problems due to limitations and disadvantages of the related art.

An object of the present invention is to provide a mobile terminal, which is capable of rapidly moving a network when moving between heterogeneous networks, and a method of moving a network thereof.

Another object of the present invention is to provide a mobile terminal, which is capable of receiving information necessary for movement of a network from a second network even when located at a first network, and a method of moving a network thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a first communication module configured to set a link with a first network, to receive second network-associated information from the first network, and to output the second network-associated information, a second communication module configured to set a receive-only mode with respect to the second network, to receive signal strength information of one or more neighbor cells belonging to the second network from the second network using the second network-associated information output from the first communication module, and to output the received signal strength information, and a controller configured to control a signal input/output operation between the first and second communication modules and a signal transmission/reception operation between the first communication module and the first network, and the second communication module and the second network, respectively.

The first communication module receives access information of a target cell from the first network according to transmission of the signal strength information output from the second communication module to the first network, and outputs the received access information, and the second communication module moves from the first network to the second network as a data communication network using the access information of the target cell output from the first communication module.

In another aspect of the present invention, a mobile terminal includes a first communication module configured to receive second network-associated information from a first network in an idle state with the first network and to output the second network-associated information, a second communication module configured to set a receive-only mode with respect to a second network, to receive signal strength information of one or more neighbor cells belonging to the second network from the second network using the second network-associated information output from the first communication module, and to output the received signal strength information, and a controller configured to determine a target cell out of the one or more neighbor cells using the signal strength information output from the second communication module.

The second communication module moves from the first network to the second network as a data communication network using access information of the target cell included in the second network-associated information, under the control of the controller.

In another aspect of the present invention, a communication control device includes a first communication module configured to set a link with a first network, to receive second network-associated information from the first network, and to output the second network-associated information, a second communication module configured to set a receive-only mode with respect to a second network, to receive signal strength information of one or more neighbor cells belonging to the second network from the second network using the second network-associated information output from the first communication module, and to output the received signal strength information, and a controller configured to control a signal input/output operation between the first and second communication modules and a signal transmission/reception operation between the first communication module and the first network, and the second communication module and the second network, respectively.

The first communication module receives access information of a target cell from the first network according to transmission of the signal strength information output from the second communication module to the first network, and outputs the received access information of the target cell, and the second communication module moves from the first network to the second network as a data communication network using the access information of the target cell output from the first communication module.

In another aspect of the present invention, a communication control device includes a first communication module configured to receive second network-associated information from a first network in an idle state with the first network and to output the received second network-associated information, a second communication module configured to set a receive-only mode with respect to a second network, to receive signal strength information of one or more neighbor cells belonging to the second network from the second network using the second network-associated information output from the first communication module, and to output the received signal strength information, and a controller configured to determine a target cell out of the one or more neighbor cells using the signal strength information output from the second communication module.

The second communication module moves from the first network to the second network as a data communication network using access information of the target cell included in the second network-associated information, under the control of the controller.

In another aspect of the present invention, a method of moving a network of a mobile terminal includes receiving second network-associated information including information associated with one or more neighbor cells belonging to a second network from a first network in a link state with the first network, setting a receive-only mode with respect to the second network, receiving signal strength information of the one or more neighbor cells from the second network using the received second network-associated information, when the receive-only mode is set, transmitting the received signal strength information to the first network, receiving access information of a target cell out of the one or more neighbor cells from the first network, and moving from the first network to the second network as a data communication network using the received access information of the target cell.

In another aspect of the present invention, a method of moving a network of a mobile terminal includes receiving second network-associated information including information associated with one or more neighbor cells belonging to a second network from a first network in an idle state with the first network, setting a receive-only mode with respect to the second network, receiving signal strength information of the one or more neighbor cells from the second network using the received second network-associated information, when the receive-only mode is set, determining a target cell out of the one or more neighbor cells using the received signal strength information, and moving from the first network to the second network as a data communication network using access information of the target cell included in the second network-associated information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A to 2C are diagrams showing the configuration of a communication control device according to one embodiment of the present invention;

FIG. 5 is a structural diagram of a message including second network-associated information according to the present invention;

FIG. 6 is a structural diagram of modified neighbor cell information included in a connection configuration message according to the present invention;

FIG. 7 is a structural diagram of a message including cell measurement result information.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
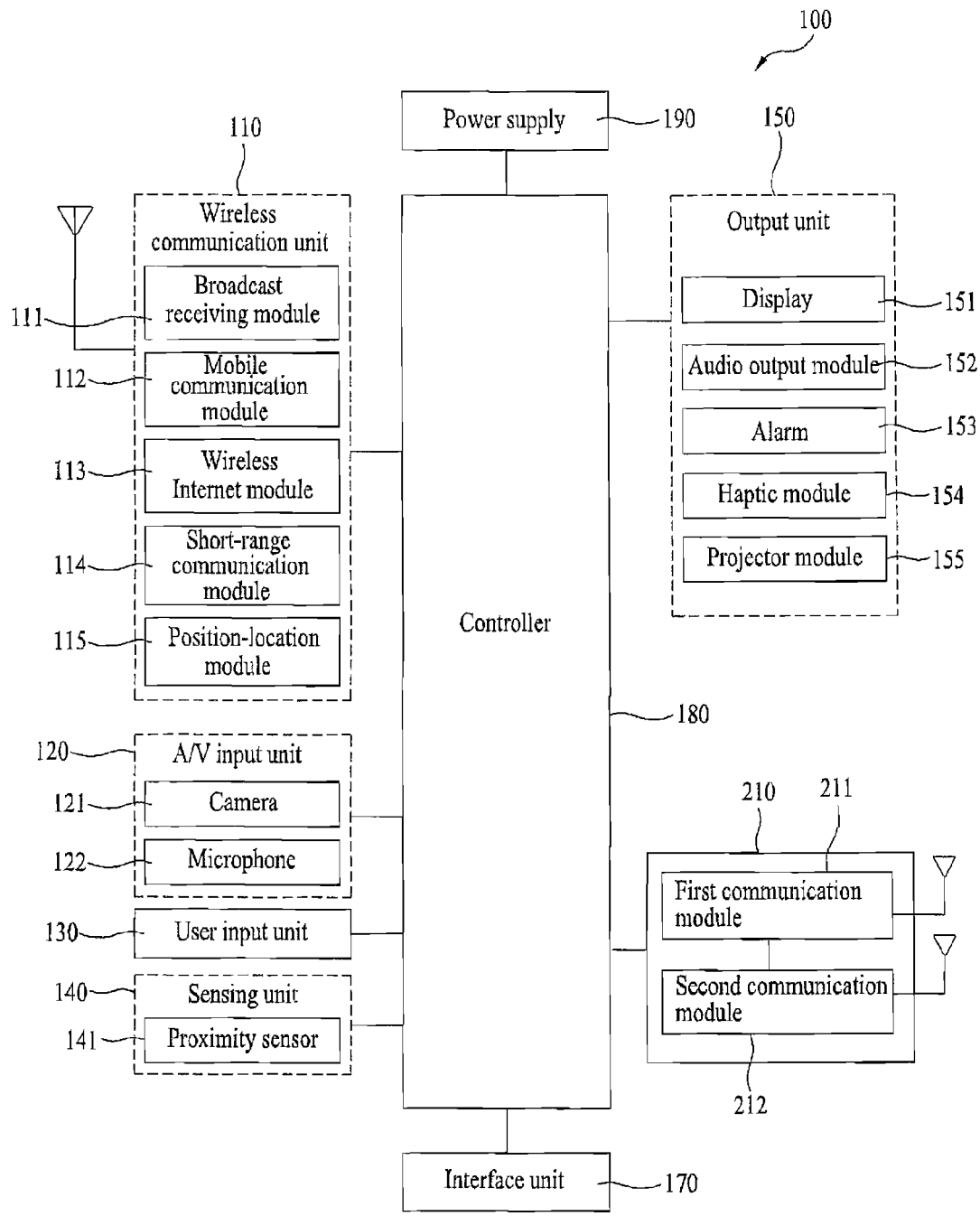
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA(High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

The mobile terminal 100 may include a network communication unit 210. The network communication unit 210 may include first and second communication modules 211 and 212 for respectively performing data communication with first and second networks.

The first and second communication modules 211 and 212 may be separately included in order to respectively perform communication with heterogeneous networks.

The network communication unit 210 may be controlled by a controller 180 or may include a separate control unit therein. The separate control unit may be included separately from the first and second communication modules 211 and 212 or included in any one of the first and second communication modules 211 and 212.

The network communication unit 210 may be included in one chip or components (e.g., the first and second communication modules 211 and 211 or the control unit) included in the network communication unit 210 may be included in respective chips.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the present specification, it is assumed that the first and second communication modules 211 and 212 respectively perform data communication with the first and second networks. In addition, it is assumed that the first and second networks are heterogeneous networks.

The network communication unit 210 shown in FIG. 1 may independently constitute a communication control device in the mobile terminal 100. Accordingly, the network communication unit 210 may be attached to or detached from the mobile terminal 100 and perform a data communication operation with a network even in a state of being detached from the mobile terminal 100.

Hereinafter, structural diagrams of the network communication unit 210 functioning as the independent communication control device will be described with reference to FIGS. 2A to 2C.

Figure 2A:
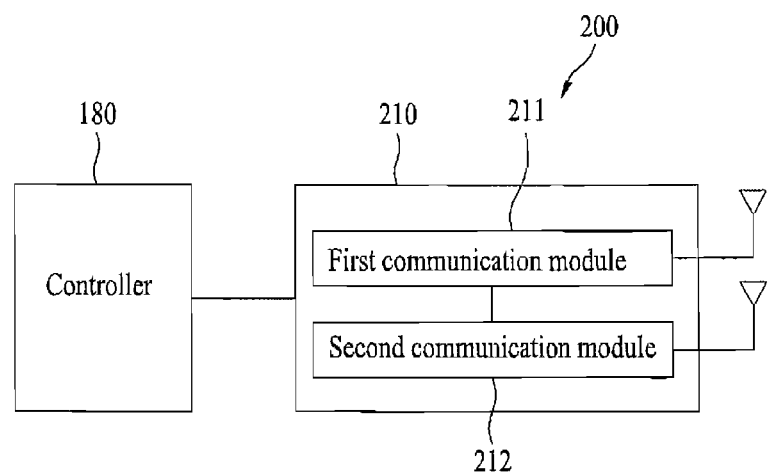

First, as shown in FIG. 2A, the network communication unit 210 may be controlled by the controller 180, if included in the mobile terminal 100. The controller 180 may control a data (signal) input/output operation between the first and second communication modules 211 and 212 and a data (signal) transmission/reception operation between the first communication module 211 and the first network and between the second communication module 212 and the second network.

Figure 2B:
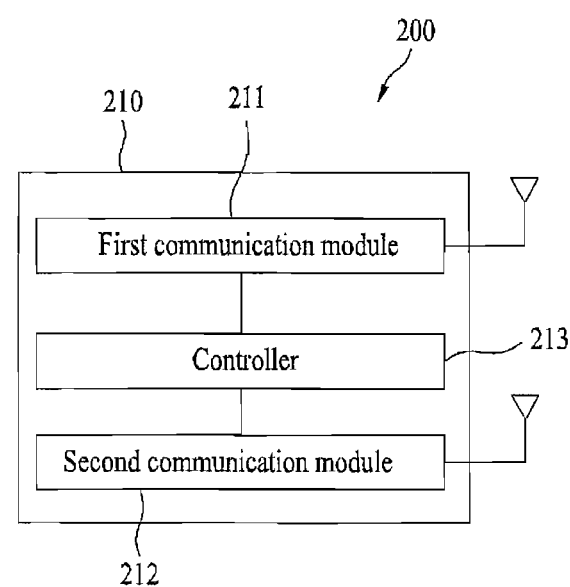

Next, as shown in FIG. 2B, the network communication unit 210 may independently constitute the communication control device in the mobile terminal 100, and may include a controller 213 for controlling the first and second communication modules 211 and 212 separately from first and second communication modules 211 and 212.

Next, as shown in FIG. 2C, the network communication unit 210 may independently constitute the communication control device in the mobile terminal 100, and may include a controller 213 in at least one of the first and second communication modules 211 and 212. For example, FIG. 2C(a) shows the case where the controller 213 is included in the first communication module 211 and FIG. 2C(b) shows the case where the controller 213 is included in the second communication module 212.

Prior to the detailed description of the present invention, a relationship between the first and second networks, to which the present invention is applied, and a data transmission/reception operation of the mobile terminal 100 at the networks will be described with reference to FIGS. 3A and 3B.

Figure 3A:
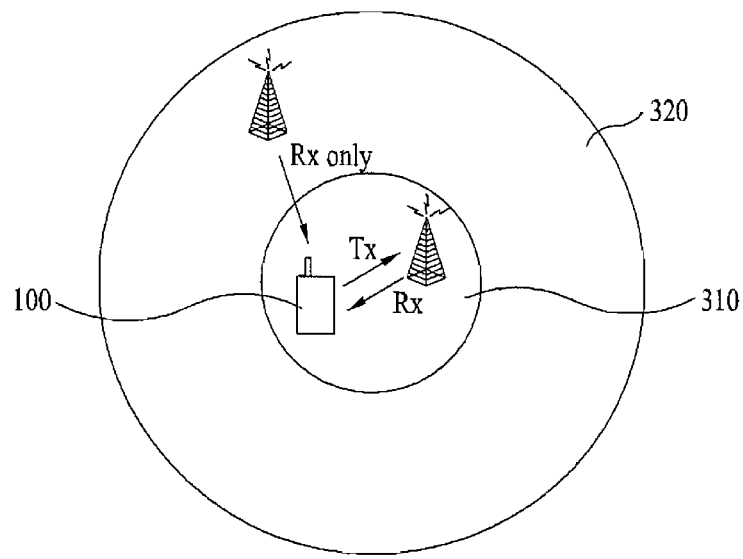
FIGS. 3A and 3B are diagrams showing a relationship between first and second networks to which the present invention is applied.
Figure 3B:
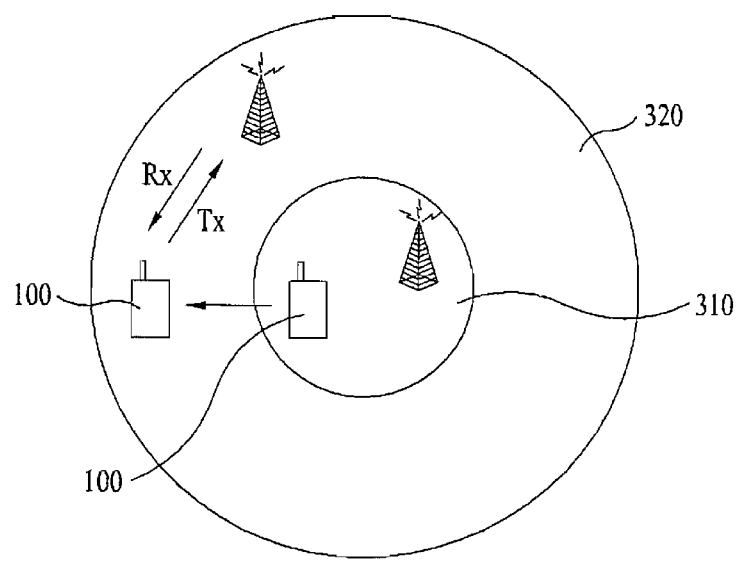

As shown in FIGS. 3A and 3B, in order to apply the present invention, a plurality of networks (e.g., first and second networks 310 and 320 having different network types are present.

The first and second networks 310 and 320 may provide Internet Protocol (IP)-based data communication services. Examples of data communication may include voice communication using Voice over Internet Protocol (VoIP) and multimedia data communication of voice/still image/moving image.

For example, the first network 310 may be a Long Term Evolution (LTE) network of a $3^{rd}$ Generation Partnership Project (3GPP) and the second network 320 may be a CDMA network (in particular, an evolved High Rate Packet Data (eHRPD) network) of a 3GPP.

In addition, the first and second networks 310 and 320 may share an accessible region of the first network 310. That is, the first network 310 is accessible in a portion of an accessible region of the second network 320.

For example, the first network 310 may be present as a hot spot within the accessible region of the second network 320.

As shown in FIG. 3A, the mobile terminal 100 may perform only a data reception operation (Rx only) from a base station belonging to the second network 320 while performing a data transmission/reception operation (Tx and Rx) with a base station belonging to the first network 310, in a state in which a data communication mode (active mode or idle mode) with the first network 310 is set.

As shown in FIG. 3B, if the mobile terminal 100 moves from the first network 310 to the second network 320 by cell re-selection or handover, the mobile terminal 100 may set a data communication mode with the first network 310 and perform a data transmission/reception operation (Tx and Rx) with the base station belonging to the second network 320.

Hereinafter, a method of moving a network of a mobile terminal according to the present invention will be described with reference to the accompanying drawings.

For convenience of description, it is assumed that the network communication unit 210 includes the controller 213 for controlling the first and second communication modules 211 and 212, separately from the controller 180. It is understood that the controller 180 may be configured to perform the below-described control operation of the controller 213.

Figure 4:
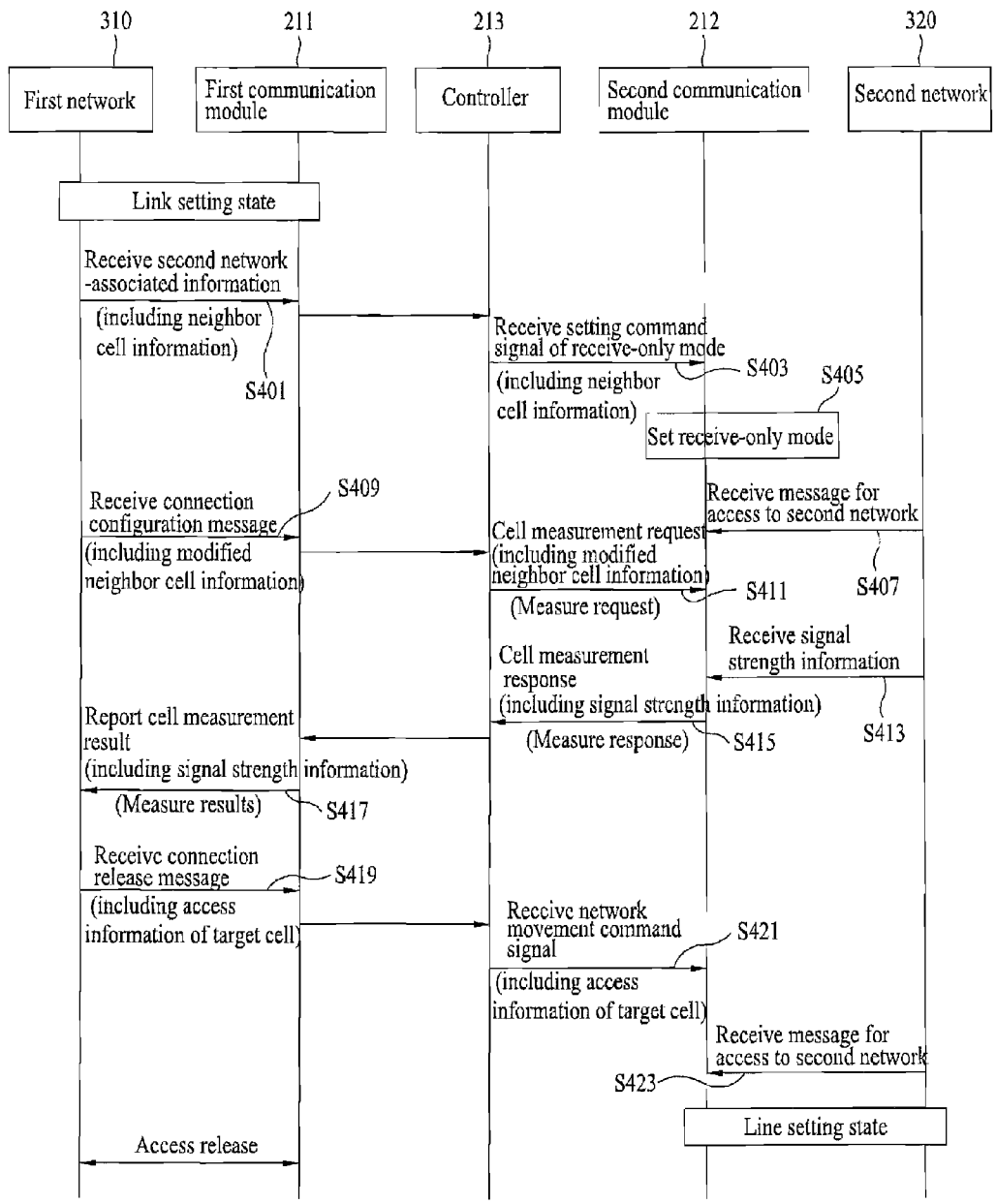
FIG. 4 is a first flowchart illustrating a method of a network of a mobile terminal according to one embodiment of the present invention.

FIG. 4 is a first flowchart illustrating a method of the network of the mobile terminal 100 in a state in which a link between the mobile terminal 100 and the first network 310 is set.

The link setting state refers to a state in which data may be transmitted or received through the link set between the mobile terminal 100 and the first network 310, and may be also called an active state or a connected state.

As shown in FIG. 4, the first communication module 211 receives a message including second network-associated information from the first network 310 (S401).

Here, the second network-associated information is information about one or more neighbor cells out of cells belonging to the second network 320, and may include a neighbor cell list, a frequency per neighbor cell, a bandclass per neighbor cell, a search window size per neighbor cell, and the like.

For example, if the first network 310 is an LTE network, the first communication module 211 may be an LTE module.

In addition, if the first network 310 is an LTE network, the message including the second network-associated information may be System Information Block Type 8 (SIB 8).

Hereinafter, the SIB 8 will be described in detail with reference to FIG. 5.

The SIB 8 may include information (hereinafter, referred to as cell re-selection information) necessary for re-selecting a cell belonging to a CDMA network when moving to the CDMA network (an example of the second network 320).

As shown in FIG. 5, the SIB 8 may include NeighbcellListCDMA 2000 501, neighCellsPerFreqList 502, neighCellsPerBandClassList CDMA 2000 503, and the like.

In more detail, the NeighCellListCDMA 2000 501 may include a neighbor cell list, the neighCellsPerFreqList 502 may include a frequency (or a channel) or ID information of each of the neighbor cells included in the neighbor cell list, and neighCellsPerBandClassList CDMA 2000 503 may include a frequency bandclass (or a group) to which each of the neighbor cells included in the neighbor cell list belongs.

Returning to FIG. 4, the first communication module 211 outputs the second network-associated information included in the message received in the reception step S401 to the controller 213.

Accordingly, the controller 213 outputs a setting command signal of a receive-only mode for the second network 320 to the second communication module 212 (S403), when receiving the second network-associated information from the first communication module 211.

The setting command signal may include neighbor cell information or cell re-selection information of the second network-associated information.

In addition, the receive-only mode for the second network 320 refers to a mode for receiving information necessary for handover from the first network 310 to the second network 320 or cell re-reselection in advance, in a state in which the mobile terminal 100 is in the link setting state or the idle state with the first network 310. In this case, only the data reception operation is supported, but the data transmission operation is not supported, with respect to the second network 320.

The controller 213 may output the setting command signal of the receive-only mode for the second network 320 to the second communication module 212, in at least one of the case where the first communication module 211 receives the second network-associated information, the case where the signal strength of the first network 310 is decreased to a predetermined criterion or less, and the case where a signal for requesting the receive-only mode is received from a user through the user input unit 130.

The second communication module 212 sets the receive-only mode for the second network 320 (S405), when receiving the setting command signal of the receive-only mode for the second network 320 from the controller 213.

Accordingly, the second communication module 212 may receive a signal or data provided by the second network 320.

Meanwhile, the setting command signal of the receive-only mode for the second network 320 may be generated by the first communication module 211 and directly output to the second module 212.

The second communication module 212 receives a message for accessing the second network from the second network 320 (S407), when setting the receive-only mode for the second network 320.

The second communication module 212 may maintain access to any cell (in particular, a cell having highest signal strength) of the neighbor cell list included in the neighbor cell information, in order to receive a signal (or data or information) from the second network 320.

The receive-only mode may be divided into an inactive state, a network determination state and a pilot acquisition state.

The second communication module 212 may enter the network determination state when receiving an activation command in the inactive state, and enter the pilot acquisition state and acquire a pilot channel of the selected specific cell when selecting a specific cell in the network determination state. The second communication module 212 may return to the inactive state if the pilot channel acquisition succeeds and return to the network determination state if the pilot channel acquisition fails.

The first communication module 211 receives a connection configuration message of the first network from the first network 310 (S409).

The connection configuration message may include second network information including modified neighbor cell information. The modified neighbor cell information may refer to modified information of the neighbor cell information included in the second network-associated information received in the reception step S401.

For example, the second network-associated information (primary second network-associated information) received in the reception step (S401) may include information associated with one or more cells belonging to a primary candidate group out of cells belonging to the second network 320, and the second network-associated information (secondary second network-associated information) received in the reception step (S409) may include information associated with one or more cells belonging to a secondary candidate group out of one or more cells belonging to the primary candidate group.

Accordingly, the secondary candidate group may be obtained by modifying (removing/changing/adding) some cells of the primary candidate group, and the secondary second network-associated information may include a modified neighbor cell list, frequency information, bandclass information, ID information, and the like of each of neighbor cells included in the modified neighbor cell list.

If the first network 310 is an LTE network, the connection configuration message is a Radio Resource Control (RRC) connection reconfiguration message, and the second network-associated information (or the modified neighbor cell information) may be included in a MeasObjectCDMA2000 information element of the RRC connection reconfiguration message.

The data structural diagram of the MeasObjectCDMA2000 information element is shown in FIG. 6.

As shown in FIG. 6, the MeasObjectCDMA2000 information element is the second network-associated information and may include carrierFreq 601, SearchWindowSize 602, cellsToRemoveList 603, cellsToAddModList 604, physCellId 605, and the like.

In more detail, the cellsToRemoveList 603 may include a cell list removed from the neighbor cell list (included in the neighCellListCDMA 2000 501 of FIG. 5) received in the reception step (S401), the cellsToAddModList 604 may include a cell list composed of added or modified cells in the neighbor cell list received in the reception step (S401), and the physCellId 605 may include an ID of each of the cells included in the modified neighbor cell list.

Returning to FIG. 4, the first communication module 211 may output the modified neighbor cell information (or the secondary second network-associated information) received in the reception step (S409) to the controller 213.

The controller 213 requests measurement of the cells included in the modified neighbor cell list to the second communication module 212 while outputting the modified neighbor cell information received from the first communication module 211 to the second communication module 212 (S411).

Alternatively, the controller 213 may output a cell measurement request signal including the modified neighbor cell information to the second communication module 212.

Meanwhile, the cell measurement request signal may be directly sent from the first communication module 211 to the second communication module 212 without passing through the controller 213.

The second communication module 212 receives signal strength information of each of one or more cells included in the modified neighbor cell list from the second network 320 (S413), when receiving the request for the cell measurement (or the cell measurement request signal) from the controller 213.

For example, the second communication module 212 may use the frequency, the bandclass, the ID, and the search window size of each of one or more cells included in the modified neighbor cell list, in order to receive the signal strength information of each of the one or more cells included in the modified neighbor cell list.

For example, the signal strength information may include the signal strength of a pilot channel of each of the one or more cells included in the modified neighbor cell list.

If necessary, the second communication module 212 may receive the signal strength information of each of the one or more cells included in the neighbor cell list using the neighbor cell information included in the primary second network-associated information.

The second communication module 212 outputs a cell measurement response signal including the signal strength information received in the reception step S413 to the controller 213 (S415).

Alternatively, the cell measurement response signal may be sent from the second communication module 212 to the first communication module 211 without passing through the controller 213.

The controller 213 may output signal strength information received from the second communication module 212 to the first communication module 211.

The first communication module 211 reports a cell measurement result including the received signal strength information to the first network 310 (S417), when receiving the signal strength information from the controller 213.

Accordingly, the first network 310 may select and report a target cell to the first communication module 211 using the cell measurement result, when moving to the second network 320.

For example, if the first network 310 is an LTE network, the cell measurement result may be included in a MeasResults information element.

FIG. 7 is a data structural diagram of a MeasResults information element.

As shown in FIG. 7, the MeasResults information element may include an ID per cell (physCellId) 701 and signal strength per cell (pilotStrength) 702.

Returning to FIG. 4, if movement to the second network 320 is necessary (for example, if the signal strength of the first network is a predetermined criterion or less), the first communication module 211 receives a connection release message from the first network 310 (S419).

The first network 310 may transmit the connection release message for releasing the connection thereof and instructing the movement to another network (e.g., the second network 320).

The connection release message may include access information of a target cell out of the neighbor cells belonging to the network to be moved to (e.g., the second network 320). For example, the access information of the target cell may include bandclass and frequency information (or channel information) of the target cell.

The controller 213 outputs a network movement command signal including the access information of the target cell to the second communication module 212 (S421), when the first communication module 211 receives the connection release message.

For example, the network movement command signal may include a handover command signal.

The second communication module 212 may move from the first network 310 to the second network 320 using the access information of the target cell included in the network movement command signal, when receiving the network movement command signal from the controller 213.

For example, the movement from the first network 310 to the second network 320 may include handover.

The second communication module 212 receives a message for access to the second network from the second network 320 (S423), when receiving the network movement command signal from the controller 213.

The second communication module 212 may set a link connection state with the second network 320, when accessing the target cell using the received access information of the target cell. In addition, the first communication module 211 may release the connection with the first network 310, when the link connection state between the second communication module 212 and the second network 320 is set.

Figure 8:
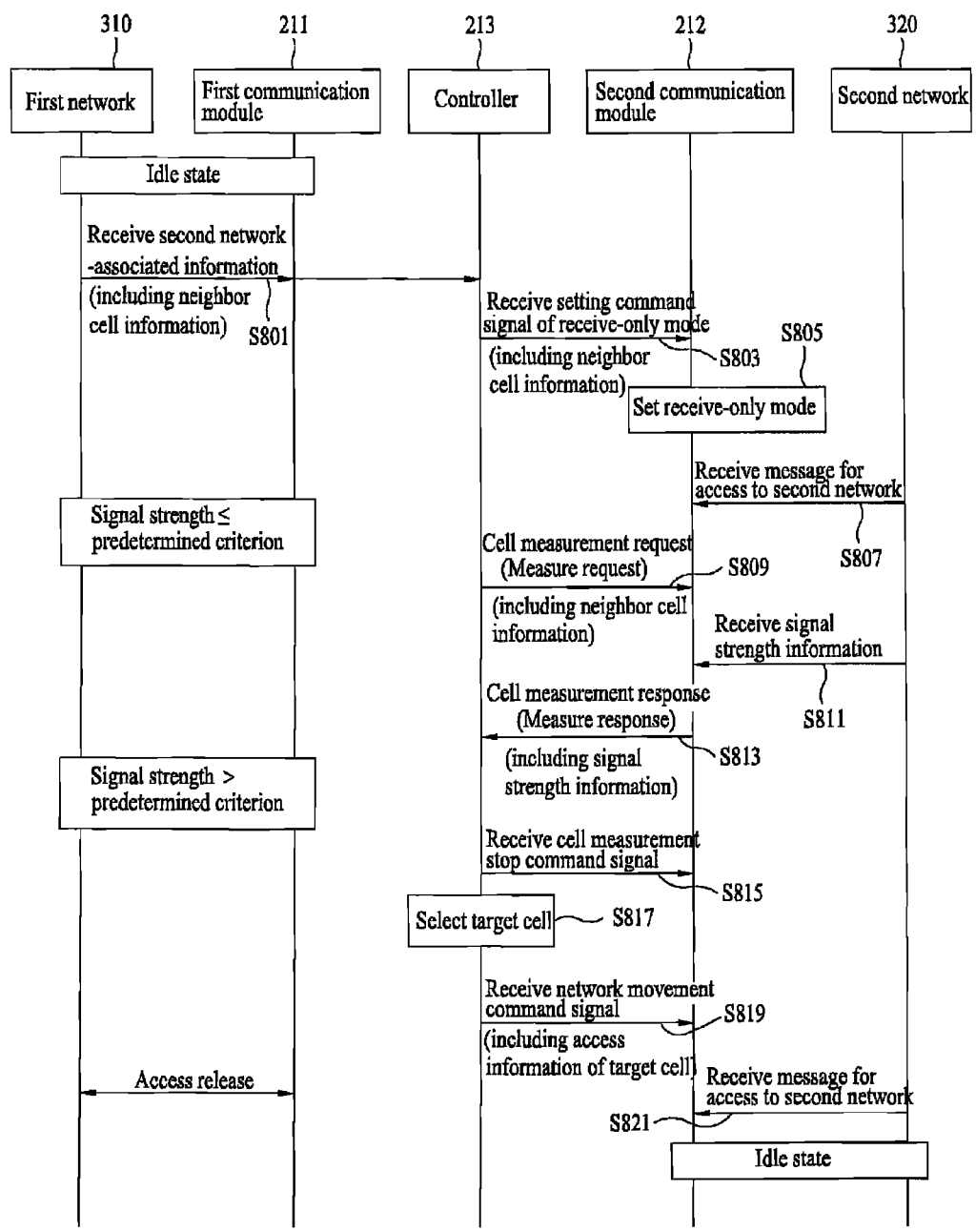
FIG. 8 is a second flowchart illustrating a method of moving a network of a mobile terminal according to one embodiment of the present invention.

FIG. 8 is a flowchart illustrating a method of moving the network of the mobile terminal 100 in the idle state between the mobile terminal 100 and the first network 310.

The idle state may refer to a standby state in which the link between the mobile terminal 100 and the first network 310 is not set, but data may be transmitted or received by setting the link at any time.

As shown in FIG. 8, the first communication module 211 receives a message including second network-associated information from the first network 310 (S801).

For the description of the reception step (S801), reference may be made to the above description of the reception step (S401) of FIG. 4.

In the reception step (S801), if the first network 310 is an LTE network, System Information Block Type 3 (SIB 3) may be received.

The SIB 3 is information for cell re-selection and may include a criterion signal strength value S-NonIntrasearch for comparing the signal strength of the neighbor cell (hereinafter, referred to as LTE neighbor cell) belonging to the LTE network. Accordingly, if a cell belonging to the second network 320 needs to be re-selected, it is determined whether the signal strength of the LTE neighbor cell is a criterion signal strength value or less and, if so, cell re-selection may be performed.

The controller 213 receives the second network-associated information included in the message received in the reception step S801 from the first communication module 211 and outputs a setting command signal of the receive-only mode for the second network 320 to the second communication module 212 (S803).

The setting command signal may include neighbor cell information or cell re-selection information of the second network-associated information.

For the description of the output step (S803), reference may be made to the above description of the output step (S403) of FIG. 4.

The second communication module 212 sets the receive-only mode for the second network 320 (S805), when receiving the setting command signal of the receive-only mode for the second network 320 from the controller 213 (S803).

The second communication module 212 receives a message for access to the second network from the second network 320 (S807), when setting the receive-only mode for the second network 320.

For the description of the reception step (S807), reference may be made to the above description of the reception step (S407) of FIG. 4.

If it is determined that the signal strength of the first network 310 is the predetermined criterion or less by the first communication module 211, then the controller 213 requests the measurement of the cell included in the neighbor cell list to the second communication module 212 while outputting the neighbor cell information included in the setting command signal of the receive-only mode received from the first communication module 211 to the second communication module 212 (S809).

Alternatively, the controller 213 may output a cell measurement request signal including the neighbor cell information to the second communication module 212.

The second communication module 212 receives the signal strength information of each of one or more cells included in the neighbor cell list from the second network 320 using the neighbor cell information (S811), when receiving the request for cell measurement from the controller 213.

For example, the signal strength information may include the signal strength of the pilot channel of each of the one or more cells included in the neighbor cell list.

Meanwhile, if it is determined by the first communication module 211 that the signal strength of the first network 310 exceeds the predetermined criterion, then the controller 213 may output a cell measurement stop command signal to the second communication module 212 (S815). Accordingly, the second communication module 212 may stop the measurement of the cell included in the neighbor cell list.

The second communication module 212 outputs a cell measurement response signal including the signal strength information received in the reception step S811 to the controller 213 (S813).

The controller 213 selects a target cell using the signal strength information included in the cell measurement response signal received from the second communication module 212 (S817), if the signal strength of the first network 310 is the predetermined criterion or less.

The controller 213 may select a cell having highest signal strength from the one or more cells included in the neighbor cell list, as the target cell.

The controller 213 outputs a network movement command signal including the access information of the selected target cell to the second communication module 212 (S819).

At this time, the access information of the target cell may be included in the second network-associated information.

For example, the network movement command signal may include a cell re-selection command signal.

The second communication module 212 may move from the first network 310 to the second network 320 using the access information of the target cell included in the network movement command signal, when receiving the network movement command signal from the controller 213.

For example, the movement from the first network 310 to the second network may include cell re-selection.

The second communication module 212 receives a message for access to the second network from the second network 320 (S821), when receiving the network movement command signal from the controller 213.

The second communication module 212 may set the idle state with the second communication 320, when accessing the target cell using the received access information of the target cell. In addition, the first communication module 211 may release the connection with the first network 310.

The above-described messages and parameters are intended only to describe examples which may be used in the embodiment of the present invention, and other messages and parameters may be used for the same object of the present invention.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

The effects of the mobile terminal and the method of moving the network thereof according to the present invention are as follows.

First, since the receive-only mode for the second network which is a heterogeneous network may be set even in the data communication state with the first network, information necessary for the movement of the network may be received from the second network in advance.

Second, since the measurement of the neighbor cell belonging to the second network may be requested to the second network which is the heterogeneous network even in the data communication state with the first network and the result thereof may be received, the target cell necessary for the movement of the network may be rapidly determined.

What is claimed is:

1. A mobile terminal comprising:
a first communication module configured to:
  set a link with a first network,
  receive information associated with a second network, and
  output the received information associated with the second network;
a second communication module configured to:
  set a receive-only mode with respect to the second network when a strength of a signal of the first network is decreased to a predetermined level or lower,
  receive signal strength information corresponding to one or more neighbor cells in the second network by using the information associated with the second network, and
  output the received signal strength information; and
a controller configured to:
  control a signal input/output operation between the first and second communication modules,
  control a first signal transmission/reception operation between the first communication module and the first network, and
  control a second signal transmission/reception operation between the second communication module and the second network,
wherein the first communication module is further configured to:
  receive a connection release message that includes access information corresponding to a target cell in the first network in response to output of the signal strength information, the target cell determined by using the transmitted signal strength information, and
  output a network movement command including the access information in response to receiving the connection release message,
wherein the second communication module is further configured to select the second network instead of the first network as a data communication network by using the access information, wherein selecting the second network is in response to the network movement command, and
wherein the information associated with the second network comprises cell-reselection information including at least a neighbor cell list, a frequency or ID information of each of neighbor cells included in the neighbor cell list, or a frequency bandclass to which each of the neighbor cells included in the neighbor cell list belongs,
wherein the first communication module is further configured to:
  receive primary information associated with the second network, the primary information including information associated with one or more cells included in a primary candidate group among cells in the second network; and
  receive secondary information associated with the second network, the secondary information including information associated with one or more cells included in a secondary candidate group among the one or more cells included in the primary candidate group, and
wherein the second communication module is further configured to receive the signal strength information using the received secondary information.

2. The mobile terminal of claim 1, wherein the first network comprises a Long Term Evolution (LTE) network and the second network comprises an evolved High Rate Data Packet (eHRDP) network.

3. The mobile terminal of claim 1, wherein:
the controller is further configured to output a cell measurement request signal including the information associated with a second network to the second communication module; and
the second communication module is further configured to receive the signal strength information when the output cell measurement request signal is received from the controller.

4. The mobile terminal of claim 1, wherein the first communication module, the second communication module and the controller are included in a single chip.

5. The mobile terminal of claim 1, wherein the second communication module is further configured to set the receive-only mode when the first communication module receives the primary information.

6. A mobile terminal comprising:
a first communication module configured to:
receive information associated with a second network, the information received via a first network that is in an idle state, and
output the received information associated with the second network;
a second communication module configured to:
set a receive-only mode with respect to the second network,
receive signal strength information corresponding to one or more neighbor cells in the second network by using the information associated with the second network, and
output the received signal strength information; and
a controller configured to:
determine a target cell among the one or more neighbor cells using the signal strength information, and
output a cell measurement request signal including the information associated with the second network when a strength of a signal of the first network is decreased to less than a predetermined level,
wherein the second communication module is further configured to:
receive the signal strength information when the cell measurement request signal is received from the controller,
select the second network instead of the first network as a data communication network by using access information of the determined target cell, the access information included in the information associated with the second network, and
set an idle state with the second network after the second network is selected instead of the first network, and
wherein the first communication module is further configured to release a connection with the first network after the second network is selected, and wherein the controller is further configured to control the second communication module to no longer receive the signal strength information when the strength of the signal of the first network is increased to the predetermined level or higher.

7. A communication control device comprising:
a first communication module configured to:
set a link with a first network,
receive information associated with a second network from the first network, and
output the received information associated with the second network;
a second communication module configured to:
set a receive-only mode with respect to the second network when a strength of a signal of the first network is decreased to a predetermined level or lower,
receive signal strength information corresponding to one or more neighbor cells in the second network by using the information associated with the second network, and
output the received signal strength information; and
a controller configured to:
control a signal input/output operation between the first and second communication modules,
control a first signal transmission/reception operation between the first communication module and the first network, and
control a second signal transmission/reception operation between the second communication module and the second network,
wherein the first communication module is further configured to:
receive a connection release message including access information corresponding to a target cell in the first network in response to output of the signal strength information to the first network, and
output a network movement command including the access information in response to receiving the connection release message,
wherein the second communication module is further configured to select the second network instead of the first network as a data communication network by using the access information,
wherein selecting the second network is in response to the network movement command, and
wherein the information associated with the second network comprises cell-reselection information including at least a neighbor cell list, a frequency or ID information of each of neighbor cells included in the neighbor cell list, or a frequency bandclass to which each of the neighbor cells included in the neighbor cell list belongs,
wherein the first communication module is further configured to:
receive primary information associated with the second network, the primary information including information associated with one or more cells included in a primary candidate group among cells in the second network; and
receive secondary information associated with the second network, the secondary information including information associated with one or more cells included in a secondary candidate group among the one or more cells included in the primary candidate group, and
wherein the second communication module is further configured to receive the signal strength information using the received secondary information.

8. A communication control device comprising:
a first communication module configured to:
receive information associated with a second network, the information received via a first network that is in an idle state, and
output the received information associated with the second network;
a second communication module configured to:
set a receive-only mode with respect to the second network, receive signal strength information corresponding to one or more neighbor cells in the second network by using the information associated with the second network, and output the received signal strength information; and a controller configured to:
determine a target cell among the one or more neighbor cells by using the signal strength information, and output a cell measurement request signal including the information associated with the second network when a strength of a signal of the first network is decreased to less than a predetermined level, wherein the second communication module is further configured to:
receive the signal strength information when the cell measurement request signal is received from the controller, select the second network instead of the first network as a data communication network by using access information corresponding to the determined target cell, the access information included in the information associated with the second network, and set an idle state with the second network after the second network is selected instead of the first network, and wherein the first communication module is further configured to release a connection with the first network after the second network is selected, and wherein the controller is further configured to control the second communication module to no longer receive the signal strength information when the strength of the signal of the first network is increased to the predetermined level or higher.

9. A method of selecting a network as a data communication network of a mobile terminal, the method comprising:
receiving information associated with a second network, the received information including information associated with one or more neighbor cells in a second network, the information received via a first network that is in a link state;

setting a receive-only mode with respect to the second network when a strength of a signal of the first network is decreased to a predetermined level or lower;

receiving signal strength information corresponding to the one or more neighbor cells in the second network by using the received information associated with the second network when the receive-only mode is set;

transmitting the received signal strength information to the first network;

receiving a connection release message that includes access information corresponding to a target cell among the one or more neighbor cells in the second network, the access information received via the first network, the target cell determined by the first network by using the signal strength information;

generating a network movement command that includes the access information in response to receiving the connection release message; and selecting the second network instead of the first network as a data communication network by using the access information, wherein selecting the second network occurs when the network movement command is generated, and wherein the information associated with the second network comprises cell-reselection information including at least a neighbor cell list, a frequency or ID information of each of neighbor cells included in the neighbor cell list, or a frequency bandclass to which each of the neighbor cells included in the neighbor cell list belongs and wherein the method further comprising: receiving primary information associated with the second network, the primary information including information associated with one or more cells included in a primary candidate group among cells in the second network; and receiving secondary information associated with the second network, the secondary information including information associated with one or more cells included in a secondary candidate group among the one or more cells included in the primary candidate group, and receiving the signal strength information using the received secondary information.

10. The method of claim 9, wherein setting the receive-only mode is performed at least when a strength of a signal of the first network is decreased to a predetermined level or lower, or when a signal for requesting the receive-only mode is received.

11. A method of selecting a network as a data communication network of a mobile terminal, the method comprising:
receiving information associated with a second network, the received information including information associated with one or more neighbor cells in the second network, the information received via a first network that is in an idle state;

setting a receive-only mode with respect to the second network;

generating a cell measurement request signal including the information associated with the second network when a strength of a signal of the first network is decreased to less than a predetermined level;

receiving signal strength information corresponding to the one or more neighbor cells in the second network by using the received information associated with the second network when the cell measurement request signal is generated;

determining a target cell among the one or more neighbor cells in the second network by using the signal strength information;

selecting the second network instead of the first network as a data communication network by using access information corresponding to the determined target cell, the access information included in the information associated with the second network;

setting an idle state with the second network after the second network is selected instead of the first network, and releasing a connection with the first network after the second network is selected and wherein the method further comprising no longer receiving the signal strength information when the strength of the signal of the first network is increased to the predetermined level or higher.

* * * * *